United States Patent
Xing et al.

(10) Patent No.: US 9,520,673 B2
(45) Date of Patent: Dec. 13, 2016

(54) CABLE CONNECTOR ASSEMBLY AND METHOD OF MANUFACTURING THE CABLE CONNECTOR ASSEMBLY

(71) Applicant: FOXCONN INTERCONNECT TECHNOLOGY LIMITED, Grand Cayman (KY)

(72) Inventors: Da-Wei Xing, Kunshan (CN); Jun Chen, Kunshan (CN); Jerry Wu, Irvine, CA (US)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/952,105

(22) Filed: Nov. 25, 2015

(65) Prior Publication Data
US 2016/0149338 A1    May 26, 2016

(30) Foreign Application Priority Data
Nov. 25, 2014 (CN) .......................... 2014 1 0684328

(51) Int. Cl.
| H01R 13/58 | (2006.01) |
| B29C 70/84 | (2006.01) |
| B29C 70/88 | (2006.01) |
| H01R 24/60 | (2011.01) |
| H01R 107/00 | (2006.01) |
| B29K 27/06 | (2006.01) |
| B29L 31/36 | (2006.01) |
| H01R 43/24 | (2006.01) |

(52) U.S. Cl.
CPC ........... *H01R 13/5845* (2013.01); *B29C 70/84* (2013.01); *B29C 70/885* (2013.01); *B29K 2027/06* (2013.01); *B29L 2031/36* (2013.01); *H01R 24/60* (2013.01); *H01R 43/24* (2013.01); *H01R 2107/00* (2013.01)

(58) Field of Classification Search
CPC ................................................ H01R 13/5845
See application file for complete search history.

(56) References Cited

U.S. PATENT DOCUMENTS

| 7,625,236 | B1* | 12/2009 | Wu ........................ | H01R 24/62 439/607.58 |
| 8,303,342 | B2* | 11/2012 | Shi ........................ | H01R 24/60 439/607.41 |
| 8,430,693 | B2 | 4/2013 | Wu | |
| 8,708,734 | B2* | 4/2014 | Su ............................ | H01R 9/03 439/452 |
| 8,821,181 | B1* | 9/2014 | Lam ....................... | H01R 24/60 439/357 |
| 9,214,767 | B1* | 12/2015 | Yu ....................... | H01R 13/6585 |

(Continued)

*Primary Examiner* — Ross Gushi
(74) *Attorney, Agent, or Firm* — Wei Te Chung; Ming Chieh Chang

(57) ABSTRACT

A cable connector assembly includes a mating member (1), a cable (300) connected with the mating member, a strain relief member (4) enclosing on the cable and the mating member, a cover (6) enclosing on the strain relief member, and a retaining member (5) formed between the strain relief member and the cover. The strain relief member is made of a first type of plastic material, and the retaining member is made of a second type of plastic material, the second type of plastic material being harder than the first type of plastic material.

18 Claims, 8 Drawing Sheets

(56) References Cited

U.S. PATENT DOCUMENTS

| | | | | |
|---|---|---|---|---|
| 9,312,644 B2* | 4/2016 | Kao | | H01R 13/6591 |
| 9,318,856 B2* | 4/2016 | MacDougall | | H01R 13/6581 |
| 9,325,137 B2* | 4/2016 | Wu | | H01R 13/6271 |
| 9,350,125 B2* | 5/2016 | Jones | | H01R 24/60 |
| 9,350,126 B2* | 5/2016 | Little | | H01R 24/60 |
| 9,385,438 B2* | 7/2016 | Wu | | H01R 4/023 |
| 9,385,483 B2* | 7/2016 | Wu | | H01R 13/6593 |
| 2015/0072562 A1* | 3/2015 | Little | | H01R 13/6658 439/607.55 |
| 2015/0162701 A1* | 6/2015 | Wu | | H01R 24/60 439/606 |
| 2015/0194768 A1* | 7/2015 | Little | | H01R 13/6594 439/607.37 |
| 2015/0194770 A1* | 7/2015 | Little | | H01R 13/6582 439/607.27 |
| 2015/0194772 A1* | 7/2015 | Little | | H01R 13/6597 439/357 |
| 2015/0214670 A1* | 7/2015 | Di | | H01R 13/506 439/607.55 |
| 2015/0288107 A1* | 10/2015 | Wu | | H01R 13/6593 439/357 |
| 2015/0303623 A1* | 10/2015 | Kao | | H01R 13/6583 439/607.04 |
| 2015/0318647 A1* | 11/2015 | Wu | | H01R 43/28 439/676 |
| 2015/0372424 A1* | 12/2015 | Little | | H01R 13/642 439/217 |
| 2016/0013581 A1* | 1/2016 | Wu | | H01R 13/5845 439/452 |
| 2016/0036167 A1* | 2/2016 | Kuang | | H01R 13/6586 439/607.34 |
| 2016/0043510 A1* | 2/2016 | Peng | | H01R 13/6593 439/607.01 |
| 2016/0043512 A1* | 2/2016 | Kao | | H01R 12/57 439/620.22 |
| 2016/0043517 A1* | 2/2016 | Wu | | H01R 9/0515 439/629 |
| 2016/0064864 A1* | 3/2016 | Kao | | H01R 13/6461 439/607.05 |
| 2016/0064868 A1* | 3/2016 | Little | | H01R 13/6581 439/607.01 |
| 2016/0064877 A1* | 3/2016 | Tamaki | | H01R 13/508 439/676 |
| 2016/0079689 A1* | 3/2016 | Wu | | H01R 9/0515 439/581 |
| 2016/0079714 A1* | 3/2016 | Wu | | H01R 13/6585 439/607.05 |
| 2016/0093987 A1* | 3/2016 | Wu | | H01R 13/665 439/620.22 |
| 2016/0104972 A1* | 4/2016 | Feng | | H01R 13/6581 439/607.27 |
| 2016/0134058 A1* | 5/2016 | Deng | | H01R 13/6581 439/607.01 |
| 2016/0141797 A1* | 5/2016 | Wu | | H01R 13/6593 439/607.55 |
| 2016/0141803 A1* | 5/2016 | Hsu | | H01R 24/60 439/607.55 |
| 2016/0141804 A1* | 5/2016 | Kao | | H01R 24/60 439/607.01 |
| 2016/0141816 A1* | 5/2016 | Chiang | | H01R 13/658 439/676 |
| 2016/0141817 A1* | 5/2016 | Wu | | H01R 24/60 439/676 |
| 2016/0141818 A1* | 5/2016 | Xing | | H01R 24/60 439/676 |
| 2016/0149338 A1* | 5/2016 | Xing | | H01R 13/5845 439/449 |
| 2016/0149347 A1* | 5/2016 | Hsu | | H01R 13/6585 439/607.05 |
| 2016/0149348 A1* | 5/2016 | Kao | | H01R 13/6585 439/607.05 |
| 2016/0156136 A1* | 6/2016 | Kao | | H01R 13/6585 439/607.05 |
| 2016/0172791 A1* | 6/2016 | Fan | | H01R 13/6585 439/607.05 |
| 2016/0172795 A1* | 6/2016 | Zhou | | H01R 13/7175 439/620.21 |
| 2016/0172804 A1* | 6/2016 | Wu | | H01R 24/60 439/676 |

\* cited by examiner

CABLE CONNECTOR ASSEMBLY AND METHOD OF MANUFACTURING THE CABLE CONNECTOR ASSEMBLY

BACKGROUND OF THE INVENTION

1. Field of the Invention

The present invention relates to a cable connector assembly, more particularly to a cable connector assembly having a retaining member, and also relates to a method of manufacturing such cable connector assembly.

2. Description of Related Arts

U.S. Pat. No. 8,430,693, issued on Apr. 30, 2013, shows a cable connector assembly including a strain relief member enclosing on a cable, and a cover enclosing on a metallic shell and the strain relief member. A gap may exist between the strain relief member and the cover such that a bending capability of the cable connector assembly is poor.

An improved cable connector assembly is desired to offer advantages over the related art.

SUMMARY OF THE INVENTION

An object of the present invention is to provide a cable connector assembly having a retaining member to increase the strength thereof.

To achieve the above-mentioned object, a cable connector assembly includes a mating member, a cable connected with the mating member, a strain relief member enclosing on the cable and the mating member, a cover enclosing on the strain relief member, and a retaining member formed between the strain relief member and the cover. The strain relief member is made of a first type of plastic material, and the retaining member is made of a second type of plastic material, the second type of plastic material being harder than the first type of plastic material.

To achieve the above-mentioned object, a method for manufacturing a cable connector assembly comprises the steps of: connecting a mating member with a cable; enclosing a retaining member on the mating member along a front-to-back direction; molding a strain relief member in the retaining member and enclosing the strain relief member on the cable and the mating member; and enclosing a cover on the retaining member and the strain relief member along a back-to-front direction and attaching the cover on the retaining member via glue.

DETAILED DESCRIPTION OF THE PREFERRED EMBODIMENT

Figure 1:
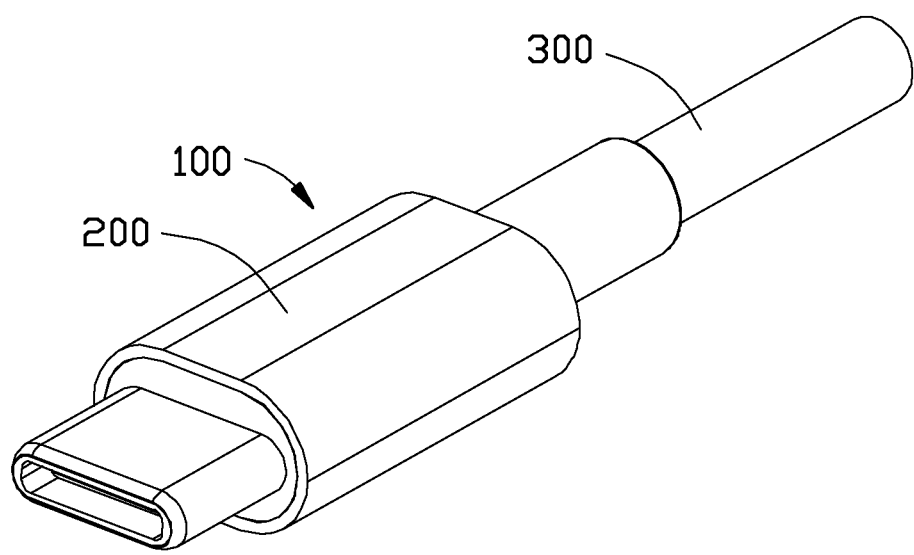
FIG. 1 is a perspective view of a cable connector assembly in accordance with the present invention.
Figure 2:
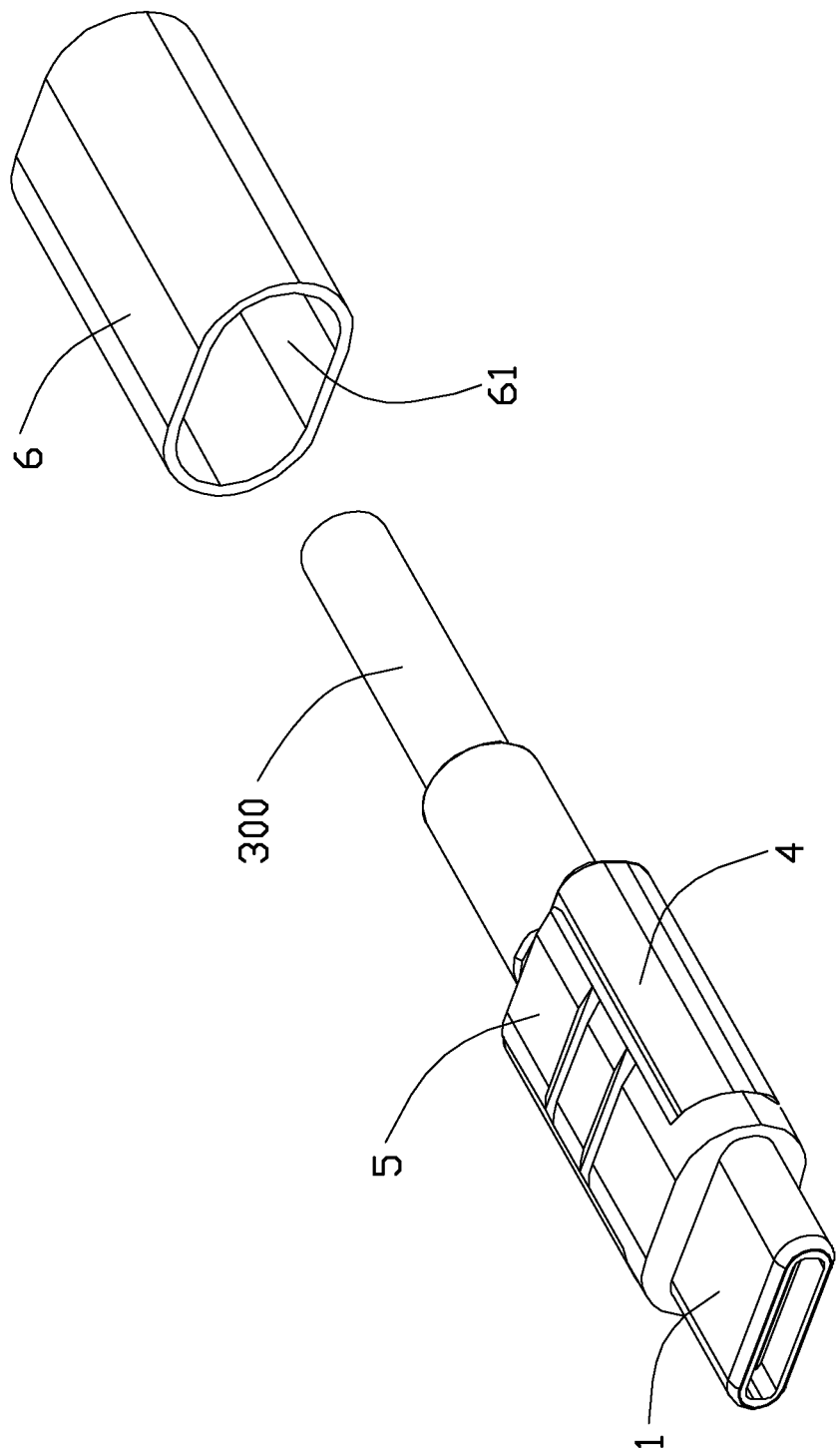
FIG. 2 is a partially exploded view of the cable connector assembly shown in FIG. 1.
Figure 3:
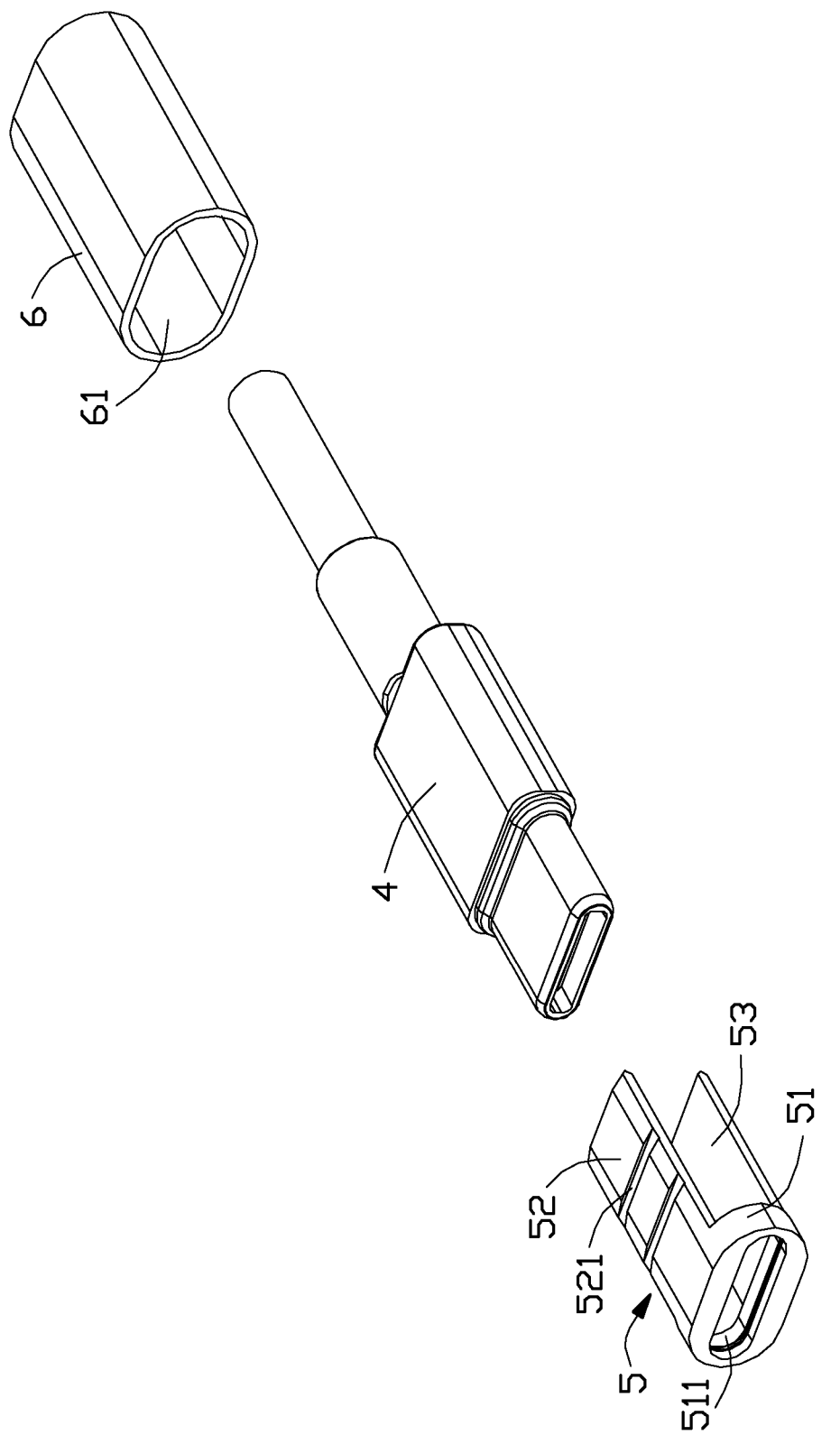
FIG. 3 is a further exploded view of the cable connector assembly shown in FIG. 2.
Figure 4:
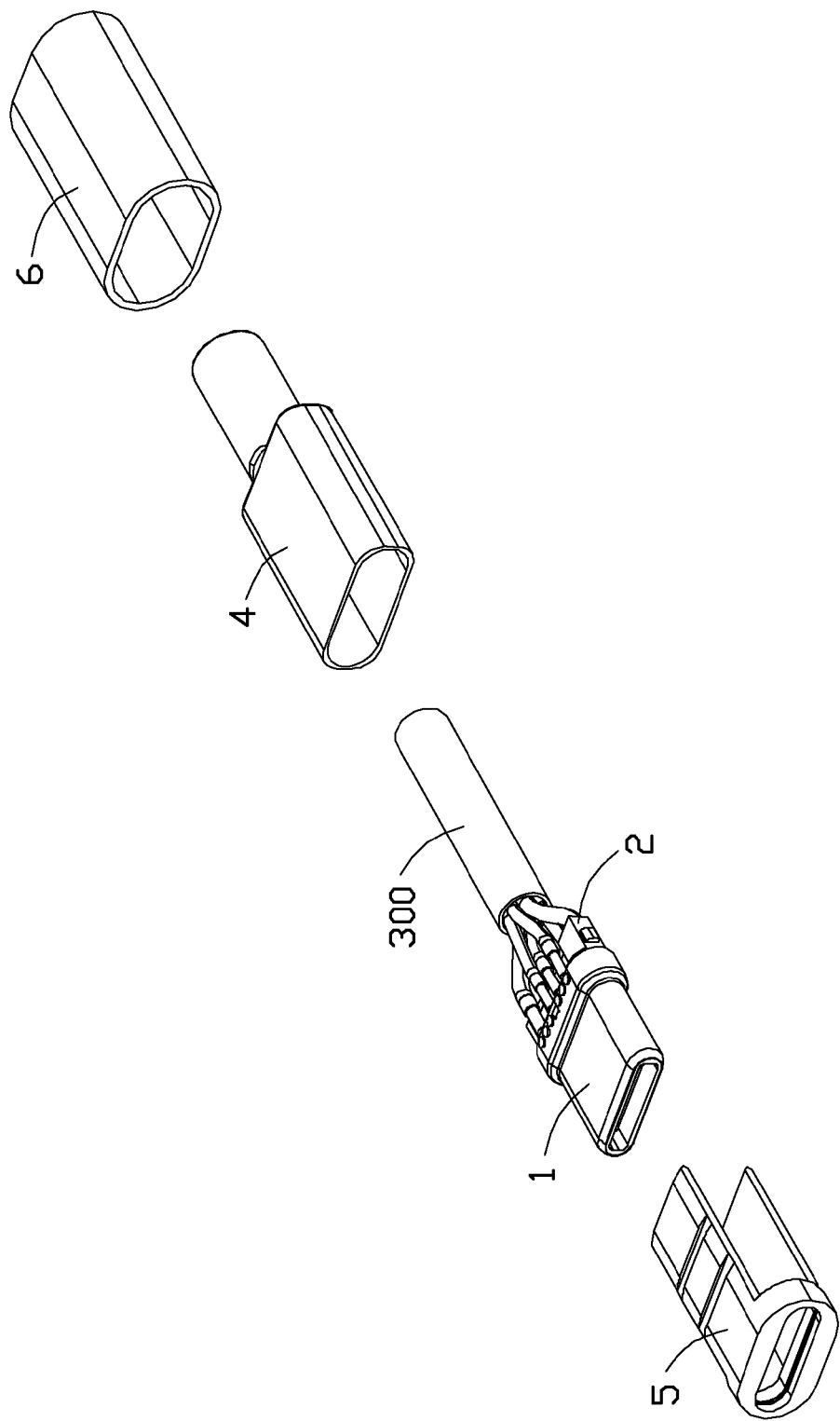
FIG. 4 is a further exploded view of the cable connector assembly as shown in FIG. 3.
Figure 5:
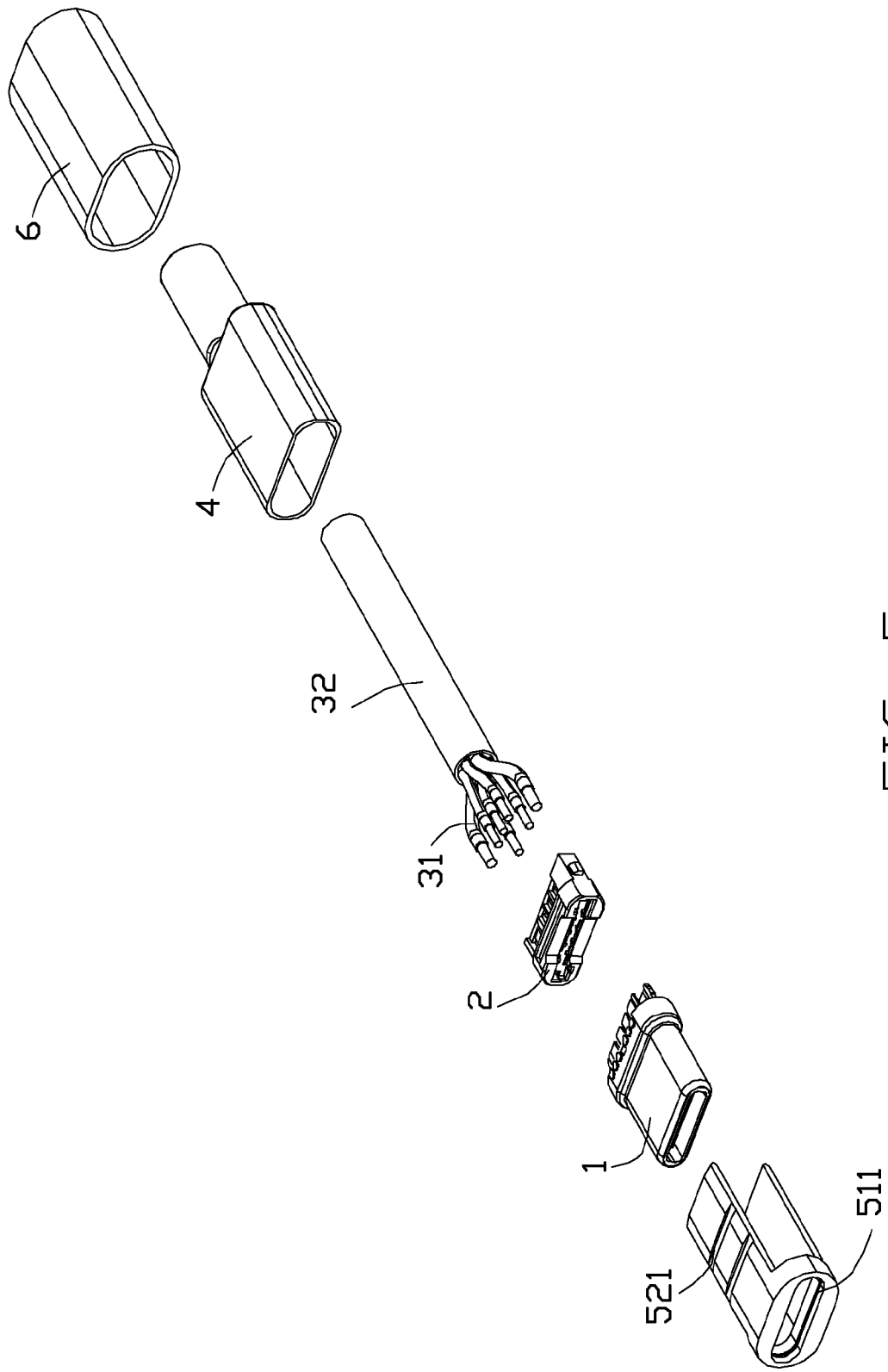
FIG. 5 is another exploded view of the cable connector assembly shown in FIG. 1.

Referring to FIGS. 1 to 5, a cable connector assembly 100 in accordance with the present invention for mating with a complementary connector (not shown) comprises an electrical connector 200 and a cable 300 electrically connected with the electrical connector 200, and the electrical connector 200 comprises a mating member 1, a spacer 2 mounted behind the mating member 1, a strain relief member including an inner mold and 4 integrated molded on the spacer 2 and the cable 300, a retaining member or stopper 5 enclosing on the strain relief member 4, and an insulative cover or outer mold 6 located outmost. The cable connector assembly 100 can mate with a complementary connector (not shown) reversibly.

Figure 6:
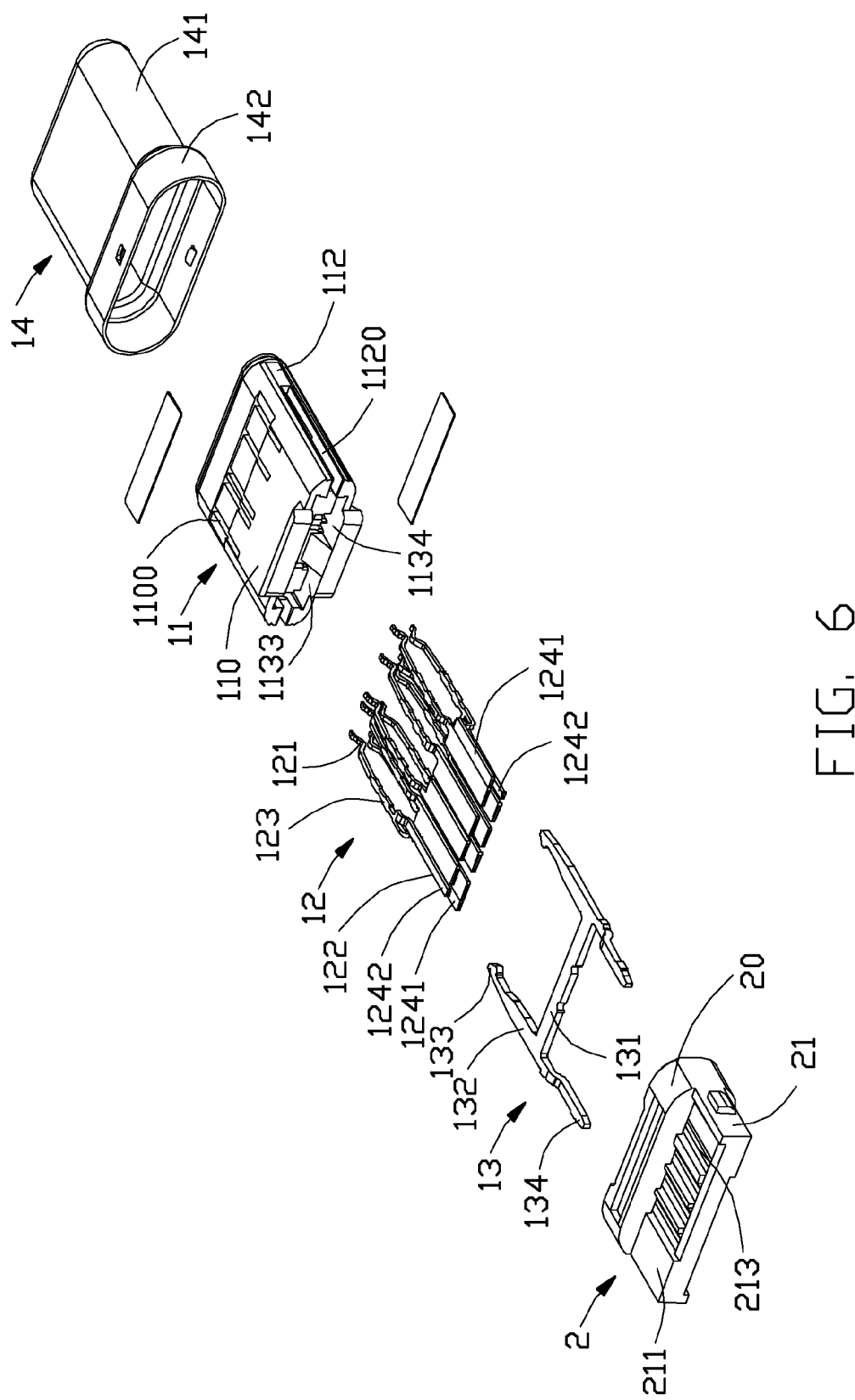
FIG. 6 is an exploded view of a mating member of the cable connector assembly as shown in FIG. 1.
Figure 7:
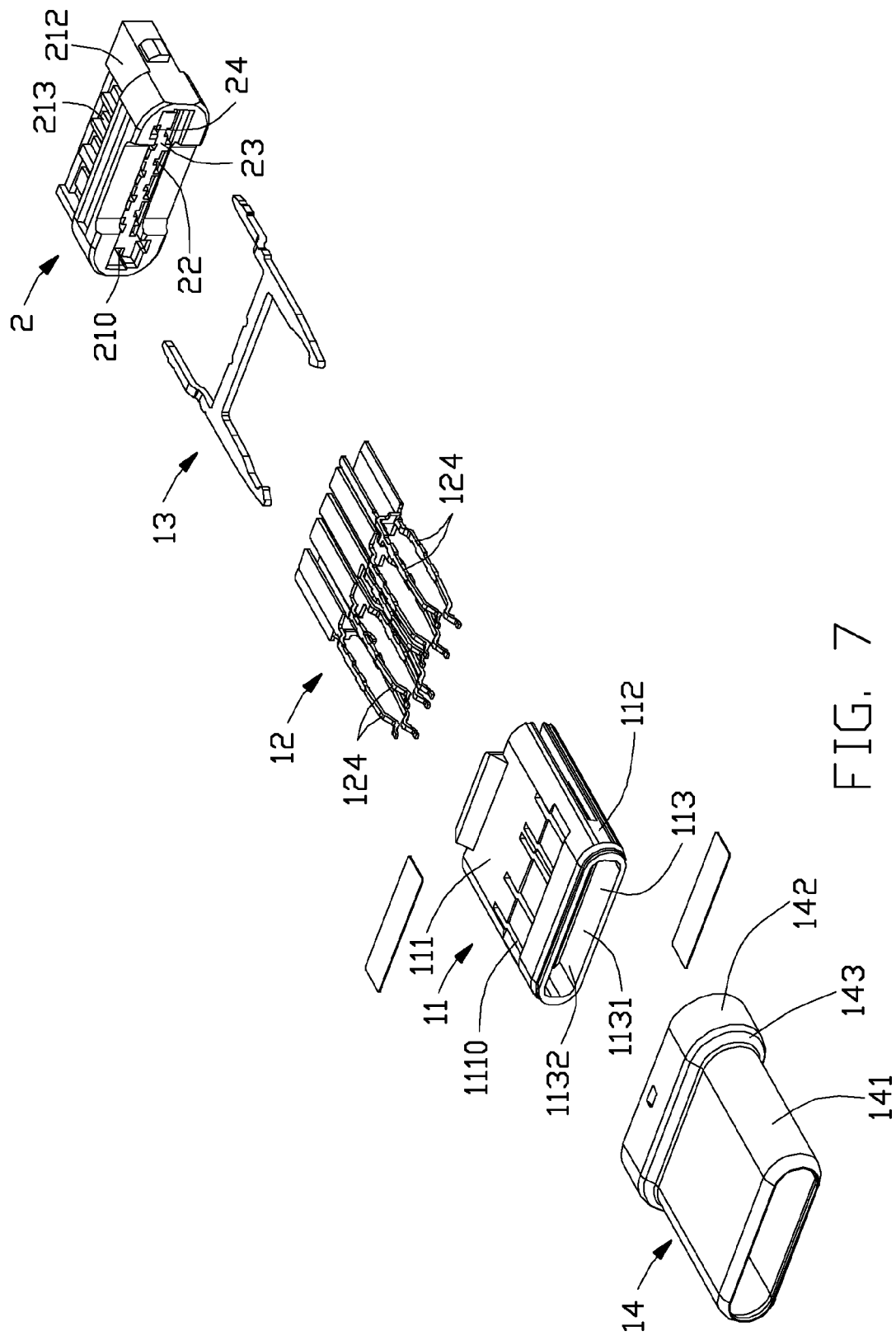
FIG. 7 is similar to FIG. 6, but viewed from another aspect.
Figure 8:
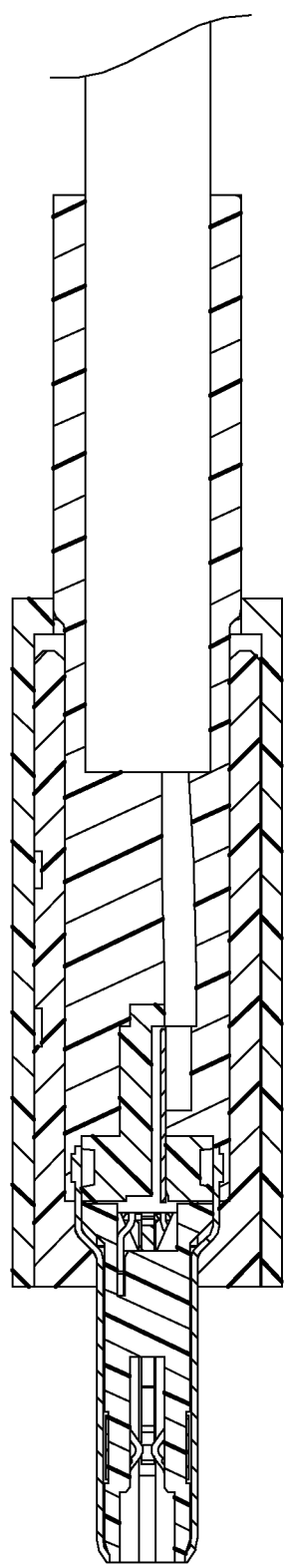
FIG. 8 is a cross-sectional view of the cable connector assembly of FIG. 1

Referring to FIGS. 6 to 7, the mating member 1 comprises an insulative housing 11, a plurality of contacts 12 arranged in two rows spaced apart from each other in a vertical direction, a latch 13 disposed between the two rows of contacts 12 for latching with the complementary connector, and a metal shell 14 covering the insulative housing 11.

The insulative housing 11 comprises a top wall 110, a bottom wall 111 spaced apart from and parallel with the top wall 110, a pair of side walls 112 connecting the top wall 110 and the bottom wall 111, and a receiving room 113 surround by the top, bottom, and side walls. The receiving room 113 is divided into a front portion 1132 having a front opening 1131, and a rear portion 1134 having a rear opening 1133. The top wall 110 defines a top recess 1100 in communication with the front portion 1132. The bottom wall 111 defines a bottom recess 1110 in communication with the front portion 1132. Each of the side walls 112 defines a side recess 1120 extending forwardly from a rear end of the insulative housing 11 but not through a front end of the insulative housing 11. The side recesses 1120 are in communication with the front portion 1132 and the rear portion 1134 of the receiving room 113.

The contacts 12 are divided into two rows spaced apart from each other along the vertical direction. Each of the contacts 12 comprises a front mating portion 121 extending forwardly into the front portion 1132 of the receiving room 113, a rear mating portion 122 extending rearwardly, and an intermediate mounting portion 123 secured to the insulative housing 11. The front mating portion 121 is to be mated with the complementary connector and the rear mating portion 122 is connected with the cable 300.

The front mating portions 121 of the two rows of contacts 12 are arranged face to face along the vertical direction. The rear mating portions 122 of the upper row of contacts 12 are arranged in a same plane, and the rear mating portions 122 of the lower row of contacts 12 are arranged in another same plane. The contacts 12 include four grounding contacts 124 arranged at both sides of the contacts 12 symmetrically. The rear mating portion of 122 of each grounding contact 124 includes a first rear mating portion 1241 and a second rear mating portion 1242. The first rear mating portions 1241 of the grounding contacts 124 in the upper row are downwardly bent to be arranged in a same plane with the first rear mating portions 1241 of the grounding contacts 124 in the lower row. The second mating portions 1242 of the grounding contacts 124 is arranged in the same plane with the rear mating portions of the other contacts 12 in the upper row. The first rear mating portions 1241 of the grounding contacts 124 in the lower row is upwardly bent to be arranged in the same plane with the first rear mating portions 1241 of the grounding contacts 124 in the upper row, and the second rear mating portions 1422 of the grounding contacts 124 in the lower row in arranged in a same plane with the rear mating portions 122 of other contacts 12 in the lower row.

The latch 13 comprises a base portion 131 extending along a transverse direction, a pair of latch beams 132 respectively extending forwardly from two opposite ends of the base portion 131, and a latch portion 133 extending from a front end of each latch beam 132 along a face to face direction, and a pair of extension arms 134 respectively extending rearwardly from the two opposite ends of the base portion 131. An extension arm 134 on one side is in a lower plane relative to a plane the base portion 131 located, and another extension arm 134 on another side is in a higher plane relative to the plane the base portion 131 located. The latch 13 is mounted into the insulative housing 11 through the rear opening 1133 of the rear portion 1134 of the receiving room 113 along a rear-to-front direction. The latch beams 132 are received into the side recesses 1120, respectively. At least a portion of the latch portions 133 projects into the front portion 1132 of the receiving room 113.

The mating shell 14 has a closed circumference that has a good seal performance, a good anti-EMI performance, etc. The closed circumference of the mating shell 14 could be manufactured by drawing a metal piece, bending a metal piece, casting metal materials, etc. The mating shell 14 comprises a front section 141 for being inserted into the complementary connector, a rear section 142 with a larger size than the front section 141, and a third transition portion 143 for connecting to the front section 141 and the rear section 142. The shape of the rear section 142 is consistent with the spacer 2. A diametrical dimension of the front section 141 is smaller than a diametrical dimension of the rear section 142.

The spacer 2 provides fixation for latch 13 together with the insulative housing 11. The spacer 2 includes a base portion 20, a extending portion 21 rearwardly extended from the base portion 20, a number of through holes 22 defined through the base portion 20 and arranged in two rows and spaced apart from each other in a vertical direction, a receiving slot 23 defined between the tow row through holes 22 and communicating with the through holes 22, and a number of receiving holes 24 side by side defined with the through holes 22. Each side of the extending portion 21 defines a mounting slot 210 communicating with the receiving slot 23 thereof. The spacer 2 is assembled to the insulative housing 11 along a rear-to-front direction, the contacts 12 is inserted into the corresponding through holes 22, the base portion 131 of the latch 13 is received in the receiving slot 23, the pair of the extension arms 134 is extended into the corresponding mounting slot 210, the second rear mating portion 1242 of the grounding contacts 124 is received in the corresponding receiving slots 24. The extending portion 21 of the spacer 2 defines a top sidewall 211 and an opposite bottom sidewall 212.

A number of accommodating grooves 213 are defined on both the top sidewall 211 and the bottom sidewall 212 for accommodating the rear mating portion 122 of the contacts 12. The rear mating portion 122 of the contacts 12 are exposed from a rear end of the corresponding though holes 22 and further received in the corresponding accommodating grooves 213 to be connected with the cable 300. The extension arms 134 of the latch 13 are exposed from the corresponding mounting slots 210 and than located on the top sidewall 211 and the second sidewall 212. The structure of the top sidewall 211 is centrosymmetric relative to the bottom sidewall 212.

The cable 300 has a number of wires 31 and a sheath 32 that contains the wires 30, the wires 31 are connected with the corresponding rear mating portion 122 of the contacts 12.

The strain relief member 4 is made of a first type of material including PVC material or other soft plastic material.

The retaining member 5 is made of a second type of material including ABS material mixed with PC material, or other hard material. The second type of material is harder than the first type of material, thus the retaining member 5 is harder than the strain relief member 4. The retaining member 5 comprises a ring portion 51 with a closed circumference, a pair of extension portion 52 extending from a back end of the ring portion 51, the extension portions 52 are opposite along the vertical direction, and an opening 53 is formed by the two separated extension portion 52. The ring portion 51 has a front aperture 511 accommodating the front section 141 of the mating shell 14, and is abutting against the rear section 142. The strain relief member 4 is combined with the retaining member 5 via glue. Each extension portion 52 has a groove 521 exposed outsides for receiving glue as the cover 6 combined with the retaining member 5, the retaining member 5 can has a groove 521 on only one extension portion 52, and also can has a pair of grooves 521 on both of the extension portion 52.

The cover 6 has a closed circumference, and is made of plastic, the cover 6 has a passageway 61 for holding the cable 300. When the cover 6 enclosing on the retaining member 5, a front segment of the retaining member 5 is exposed in front of the cover 6.

In assembling the cable connector assembly 100, firstly, the contacts 12 and the latch 13 are inserted into the insulative housing 11, and then the insulative housing 11 is received in the mating shell 14, and the spacer 2 is received in the rear section 142 of the mating shell 14. The rear mating portion 122 of the contacts 12 received in the mating member 1 is passed through the corresponding through holes 22 of the spacer 2 and received in the corresponding accommodating grooves 213 thereof. The extension arms 134 of the latch 13 are passing through the mounting slot 210 and located on the top sidewall 211 and the bottom sidewall 212 of the spacer 2. The extension arms 134 of the latch 13 are soldered or pasted on the top sidewall 211 and the bottom sidewall 212. The wires 31 of the cable 300 are soldered on the corresponding rear mating portions 122, the two first rear mating portion 1241 of the grounding contacts 124 are soldered on a wire 31.

The retaining member 5 is enclosed on the mating member 1 along a front-to-back direction, until the front aperture 511 against the rear section 142 of the mating shell 14. Then the strain relief member 4 is molded in the retaining member 5, and located on the cable 300 and the mating member 1, in the molding process, redundant first type of material can flow from the opening 53 of the retaining member 5, and the retaining member 5 can be coupled with the strain relief member 4 via glue. Finally, the cover 6 is enclosing on the retaining member 5 and the strain relief member 4 along a back-to-front direction, and the cover 6 is combined with the retaining member 5 by applying glue in the groove 521. As the retaining member 5 made of hard plastic material, the retaining member 5 not only occupies space between the strain relief member 4 and the cover 6, but also the strength of the cable connector assembly 100 can be increased.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable connector assembly comprising:
   a mating member;
   a cable connected with the mating member;
   a strain relief member enclosing on the cable and the mating member and made of a first type of plastic material;
   a cover enclosing on the strain relief member; and
   a retaining member formed between the strain relief member and the cover and made of a second type of plastic material, the second type of plastic material being harder than the first type of plastic material.

2. The cable connector assembly as recited in claim 1, wherein the retaining member comprises a ring portion with a closed circumference, a pair of extension portions extending from a back end of the ring portion, and an opening formed by the two extension portions.

3. The cable connector assembly as recited in claim 2, wherein the mating member has a metal shell, the mating shell comprising a front section for being inserted into a complementary connector and a rear section of a larger size than the front section.

4. The cable connector assembly as recited in claim 3, wherein the ring portion has a front aperture accommodating the front section of the mating shell and abutting against the rear section of the mating shell.

5. The cable connector assembly as recited in claim 3, wherein the retaining member is coupled with the strain relief member via glue.

6. The cable connector assembly as recited in claim 5, wherein each extension portion has a groove exposed to outside for receiving glue when combining the cover with the retaining member.

7. The cable connector assembly as recited in claim 1, wherein the first type of plastic material is PVC material.

8. The cable connector assembly as recited in claim 1, wherein the second type of plastic material is ABS material mixed with PC material.

9. A method for manufacturing a cable connector assembly, comprising the steps of:
   connecting a mating member with a cable;
   enclosing a retaining member on the mating member along a front-to-back direction;
   molding a strain relief member in the retaining member and enclosing the strain relief member on the cable and the mating member; and
   enclosing a cover on the retaining member and the strain relief member along a back-to-front direction and attaching the cover on the retaining member via glue.

10. The method as recited in claim 9, further comprising a step of coupling the retaining member with the strain relief member via glue.

11. A cable connector assembly comprising:
    a mating member including an insulative housing having a plurality of contacts disposed therein and enclosed within a metallic shell, said mating member defining a small front section and a large rear section along a front-to-back direction;
    a cable located behind the mating member and including a plurality of wires respectively electrically connected to the corresponding contacts, respectively;
    an insulative inner mold enclosing an region about an interface of said wires and said contacts; and
    an insulative retaining member including a front wall with an opening through which the small front section forwardly extends snugly, and at least one lateral wall rearwardlty extending from a periphery of the front wall; and
    an insulative outer mold enclosing the inner mold; wherein
    said lateral wall is sandwiched between the outer mold and the inner mold radially.

12. The cable connector assembly as claimed in claim 11, wherein glue is applied to an interface between the outer mold and the lateral wall.

13. The cable connector assembly as claimed in claim 12, wherein said lateral wall forms at least one slot to receive the glue.

14. The cable connector assembly as claimed in claim 11, wherein glue is applied to an interface between the inner mold and the lateral wall.

15. The cable connector assembly as claimed in claim 11, wherein the inner mold contacts the outer mold in a first lateral direction while isolated from the outer mold in a second lateral direction perpendicular to said first lateral direction.

16. The cable connector assembly as claimed in claim 11, wherein said retaining member forms a short tubular structure around the front wall, and said lateral wall extends rearwardly from a rear edge of the short tubular structure.

17. The cable connector assembly as claimed in claim 11, wherein said inner mold further includes a strain relief structure to surround the cable, and said outer mold defines a flange structure at the rear end to contact the strain relief structure radially.

18. The cable connector assembly as claimed in claim 11, wherein said front wall is located adjacent to a boundary between the small front section and the large rear section.

* * * * *